United States Patent
Butler et al.

(10) Patent No.: US 10,282,014 B2
(45) Date of Patent: May 7, 2019

(54) OPERATING MULTIPLE FUNCTIONS IN A DISPLAY OF AN ELECTRONIC DEVICE

(71) Applicant: APPLE INC., Cupertino, CA (US)

(72) Inventors: Christopher J. Butler, Cupertino, CA (US); Peter W. Richards, San Francisco, CA (US); Christian M. Sauer, Cupertino, CA (US); Manu Agarwal, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 409 days.

(21) Appl. No.: 15/025,275

(22) PCT Filed: Sep. 30, 2013

(86) PCT No.: PCT/US2013/062562
§ 371 (c)(1),
(2) Date: Mar. 27, 2016

(87) PCT Pub. No.: WO2015/047374
PCT Pub. Date: Apr. 2, 2015

(65) Prior Publication Data
US 2016/0216833 A1     Jul. 28, 2016

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04104* (2013.01); *G06F 2203/04105* (2013.01)

(58) Field of Classification Search
CPC ...... G06F 3/0414; G06F 3/044; G06F 3/0412; G06F 3/0416; G06F 2203/04105;
(Continued)

(56) References Cited

U.S. PATENT DOCUMENTS

| 5,142,912 A | 9/1992 | Frische |
| 5,345,807 A | 9/1994 | Butts et al. |

(Continued)

FOREIGN PATENT DOCUMENTS

| CN | 1496549 | 5/2004 |
| CN | 102236463 | 11/2011 |

(Continued)

OTHER PUBLICATIONS

International Search Report and Written Opinion dated Apr. 29, 2014, PCT/US2013/062562, 10 pages.

(Continued)

*Primary Examiner* — Bryan Earles
(74) *Attorney, Agent, or Firm* — Brownstein Hyatt Farber Schreck, LLP

(57) ABSTRACT

A system can include a display, a first device, and a second device all operatively connected to a controller. The first and second devices each use or share at least a portion of the display area. The controller is adapted to transmit during a pixel refresh time period of the display a first signal that is received by the first device. The first sync signal indicates a first time period in which a first operation can be performed in the first device. The controller is also adapted to transmit a second sync signal that is received by the second device indicating a second time period in which a second operation can be performed in the second device. The second time period can be during the pixel refresh time period or outside of the pixel refresh time period.

20 Claims, 11 Drawing Sheets

(58) Field of Classification Search
CPC ............ G06F 2203/04104; G09G 3/20; G09G 3/2092; G09G 2300/0426; G09G 2310/08
See application file for complete search history.

(56) References Cited

U.S. PATENT DOCUMENTS

| | | | |
|---|---|---|---|
| 5,552,568 | A | 9/1996 | Onodaka et al. |
| 5,905,430 | A | 5/1999 | Yoshino |
| 5,911,158 | A | 6/1999 | Henderson |
| 6,069,417 | A | 5/2000 | Yuan |
| 6,099,476 | A | 8/2000 | Engel |
| 6,130,517 | A | 10/2000 | Yuan |
| 6,788,050 | B2 | 9/2004 | Gotkis |
| 6,998,545 | B2 | 2/2006 | Harkcom et al. |
| 7,046,496 | B2 | 5/2006 | Hsin |
| 7,084,933 | B2 | 8/2006 | Oh et al. |
| 7,451,050 | B2 | 11/2008 | Hargreaves |
| 7,463,987 | B2 | 12/2008 | Cech et al. |
| 7,536,918 | B2 | 5/2009 | Rankin et al. |
| 7,543,501 | B2 | 6/2009 | Cottles et al. |
| 7,683,634 | B2 | 3/2010 | Hoen |
| 7,688,308 | B2 | 3/2010 | Inokuchi |
| 7,825,903 | B2 | 11/2010 | Anastas et al. |
| 8,289,290 | B2 | 10/2012 | Klinghult |
| 8,290,602 | B2 | 10/2012 | Begey et al. |
| 8,305,358 | B2 | 11/2012 | Klinghult |
| 8,436,809 | B2 | 5/2013 | Sohn et al. |
| 8,547,114 | B2 | 10/2013 | Kremin |
| 8,547,118 | B1 | 10/2013 | Vojjala |
| 8,547,350 | B2 | 10/2013 | Anglin et al. |
| 8,622,923 | B2 | 1/2014 | Pons et al. |
| 8,669,960 | B2 | 3/2014 | Murphy et al. |
| 8,760,248 | B2 | 6/2014 | Marie |
| 8,780,074 | B2 | 7/2014 | Castillo et al. |
| 8,860,437 | B2 | 10/2014 | Santana et al. |
| 8,917,198 | B2 | 12/2014 | Pagnanelli |
| 8,976,137 | B2 | 3/2015 | Goo et al. |
| 8,982,310 | B2 | 3/2015 | Roudbari et al. |
| 9,000,967 | B2 | 4/2015 | Pagnanelli |
| 9,052,250 | B1 | 6/2015 | Parker et al. |
| 9,063,627 | B2 | 6/2015 | Yairi et al. |
| 9,104,267 | B2 | 8/2015 | Choi |
| 9,105,255 | B2 | 8/2015 | Brown et al. |
| 9,268,432 | B2* | 2/2016 | Guo .................... G06F 3/0416 |
| 9,274,660 | B2 | 3/2016 | Bernstein et al. |
| 9,297,831 | B2 | 3/2016 | Ahn et al. |
| 9,310,950 | B2 | 4/2016 | Takano et al. |
| 9,373,993 | B2 | 6/2016 | Irwin |
| 9,389,686 | B2 | 7/2016 | Zoller et al. |
| 9,389,727 | B2 | 7/2016 | Woolley |
| 9,411,454 | B2* | 8/2016 | Fujioka .................... G06F 3/044 |
| 9,477,342 | B2 | 10/2016 | Daverman et al. |
| 9,483,146 | B2 | 11/2016 | Davidson et al. |
| 9,726,922 | B1 | 8/2017 | Agarwal et al. |
| 9,726,933 | B2 | 8/2017 | Agarwal et al. |
| 9,727,168 | B2* | 8/2017 | Fuller .................... G06F 3/0416 |
| 9,830,025 | B2* | 11/2017 | Han .................... G06F 3/0412 |
| 9,983,715 | B2 | 5/2018 | Filiz et al. |
| 2004/0100007 | A1 | 5/2004 | Engwall et al. |
| 2007/0268246 | A1 | 11/2007 | Hyatt |
| 2008/0011091 | A1 | 1/2008 | Weldon |
| 2008/0289887 | A1 | 11/2008 | Flint et al. |
| 2009/0028321 | A1 | 1/2009 | Cheng |
| 2010/0005851 | A1 | 1/2010 | Cottles et al. |
| 2010/0123686 | A1 | 5/2010 | Klinghult et al. |
| 2010/0207900 | A1* | 8/2010 | Kung .................... G06F 3/0412 345/173 |
| 2010/0309146 | A1 | 12/2010 | Lee et al. |
| 2011/0227872 | A1 | 9/2011 | Huska et al. |
| 2012/0038577 | A1 | 2/2012 | Brown et al. |
| 2012/0038583 | A1 | 2/2012 | Westhues et al. |
| 2012/0319827 | A1 | 12/2012 | Pance et al. |
| 2013/0127756 | A1 | 5/2013 | Wang et al. |
| 2014/0142395 | A1 | 5/2014 | Sattler et al. |
| 2014/0176485 | A1 | 6/2014 | Holmberg et al. |
| 2014/0298884 | A1 | 10/2014 | Mindlin et al. |
| 2015/0022476 | A1* | 1/2015 | Fujioka .................... G06F 3/044 345/173 |
| 2015/0103961 | A1 | 4/2015 | Malipatil et al. |
| 2015/0160783 | A1 | 6/2015 | Kaneko et al. |
| 2015/0371608 | A1 | 12/2015 | Yamaguchi et al. |
| 2016/0062530 | A1* | 3/2016 | Huppi .................... G06F 3/023 345/177 |
| 2016/0117019 | A1* | 4/2016 | Takeda .................... G06F 3/03 345/174 |
| 2016/0179200 | A1 | 6/2016 | Billington et al. |
| 2016/0179243 | A1 | 6/2016 | Schwartz |
| 2016/0209441 | A1 | 7/2016 | Mazzeo et al. |
| 2016/0259411 | A1 | 9/2016 | Yoneoka et al. |
| 2016/0259465 | A1 | 9/2016 | Agarwal et al. |
| 2017/0017346 | A1 | 1/2017 | Gowreesunker et al. |
| 2017/0052622 | A1 | 2/2017 | Smith |
| 2017/0090667 | A1 | 3/2017 | Abdollahian et al. |
| 2017/0147102 | A1* | 5/2017 | Wang .................... G06F 3/0412 |
| 2017/0300146 | A1* | 10/2017 | Han .................... G06F 3/0414 |
| 2017/0308207 | A1* | 10/2017 | Azumi .................... G06F 3/044 |
| 2017/0351368 | A1 | 12/2017 | Agarwal et al. |
| 2018/0039367 | A1* | 2/2018 | Suzuki .................... G06F 3/0414 |

FOREIGN PATENT DOCUMENTS

| | | |
|---|---|---|
| CN | 102713805 | 10/2012 |
| CN | 103097990 | 5/2013 |
| EP | 0189590 | 8/1986 |
| EP | 1455264 | 9/2004 |
| WO | WO 10/055195 | 5/2010 |
| WO | WO 13/170099 | 11/2013 |
| WO | WO 13/188307 | 12/2013 |
| WO | WO 14/101943 | 7/2014 |
| WO | WO 15/080696 | 6/2015 |

OTHER PUBLICATIONS

Bau, et al., "TeslaTouch: Electrovibration for Touch Surfaces," UIST'10, Oct. 3-6, 2010, New York, New York USA, 10 pages.

Feist, "Samsung snags patent for new pressure sensitive touchscreens," posted on AndroidAuthority.com at URL: http://www.androidauthority.com/samsung-patent-pressure-sensitive-touchscreens-354860, Mar. 7, 2014, 1 page.

* cited by examiner

OPERATING MULTIPLE FUNCTIONS IN A DISPLAY OF AN ELECTRONIC DEVICE

CROSS REFERENCE TO RELATED APPLICATION

This application is a 35 U.S.C. § 371 application of PCT/US2013/062562, filed on Sep. 30, 2013, and entitled "Operating Multiple Functions in a Display of an Electronic Device," which is incorporated by reference as if fully disclosed herein.

TECHNICAL FIELD

The present invention relates generally to electronic devices, and more specifically to performing multiple functions in a display area of an electronic device.

BACKGROUND

Electronic devices such as smart telephones and tablet computing devices include a display a user can use to view images and to interact with various components or functions in the electronic device. For example, a display can include a multi-touch touchscreen that the user touches to select or interact with an object or application displayed on the display. From the perspective of the user, the display simultaneously displays the object and a touch sensing device detects one or more touch events on the input surface of the display. However, the circuitry associated with the display and the circuitry associated with the touch sensing device may or may not operate concurrently due to signal interference and noise issues that occur when the two functions operate concurrently.

As the number of functions that use or share the display area increase, issues such as noise, interference and interference between the devices performing the functions can also increase and interfere with the operation of at least one function. For example, a force sensing device can use the top surface of the display as an input surface. In some situations, the noise produced by one function, such as the display, can overwhelm the signals produced during another operation, such as a force sensing operation. The display signals can be noise for the force sensing signals. The magnitude of the display signals can be much greater than the magnitude of the force sensing signals, making it difficult to discern the force sensing signals from the noise.

SUMMARY

In one aspect, a system can include a display, a first device, and a second device, with the first and second devices sharing at least a portion of an area of the display. A method for operating the system can include performing a refresh operation on at least a portion of the pixels in the display during a pixel refresh time period and performing a force sensing operation in the force sensing device during a first time period that occurs during the pixel refresh time period. A touch sensing operation in the touch sensing device can be performed during a second time period. The touch sensing operation can be performed within the pixel refresh time period or not within (outside of) the pixel refresh time period.

In some embodiments, the force sensing device can use capacitive sensing technology to detect force. One or more excitation signals can be received by the force sensing device during the pixel refresh time period, and one or more force sense signals can be received from the force sensing device when noise is minimized or reduced during the pixel refresh time period. Other embodiments can use a different sensing technology to detect force, such as ultrasound or piezoelectric technology.

The touch sensing device can also use capacitive sensing technology to detect touch in some embodiments. One or more excitation signals can be received by the touch sensing device during the second time period, and one or more touch sense signals can be received from the touch sensing device during the second time period. Other embodiments can use a different sensing technology to detect touch, such as ultrasound or resistive technology. The second time period may occur during the pixel refresh time period, or the second time period can occur independent (outside) of the pixel refresh time period. When the first and second time periods occur during the pixel refresh time period, the first and second time periods can be non-overlapping distinct time periods.

In another aspect, a method for operating multiple functions in an area of a display can include during a pixel refresh time period, performing a refresh operation on at least a portion of the pixels in the display, and during at least a portion of the pixel refresh time period, receiving a force sync signal to indicate a first time period in which a force sensing operation can be performed in the force sensing device. For example, one or more excitation signals can be received by the force sensing device during the first time period. Additionally, one or more force sense signals can be received from the force sensing device during the first time period. A touch sync signal can be received by the touch sensing device that indicates a second time period in which a touch sensing operation can be performed in the touch sensing device. For example, during the second time period, the touch sensing device can receive one or more touch excitation signals and the touch sensing device can output one or more touch sense signals.

In another aspect, a system can include a display having a plurality of pixels, a force sensing device, a touch sensing device, and a controller operatively connected to the display, to the force sensing device, and to the touch sensing device. The force sensing device and the touch sensing device can each use or share at least a portion of the area of the display. At least a portion of the pixels can be refreshed during a pixel refresh time period. The controller is adapted to transmit during the pixel refresh time period a first sync signal that is received by the force sensing device indicating a first time period in which a first operation in the force sensing device can be performed. The controller can be further adapted to transmit a second sync signal that is received by the touch sensing device indicating a second time period in which a second operation can be performed in the touch sensing device. The second time period may occur during the pixel refresh time period, or the second time period can occur outside of the pixel refresh time period. When the first and second time periods occur during the pixel refresh time period, the first and second time periods can be non-overlapping distinct time periods.

BRIEF DESCRIPTION OF THE DRAWINGS

Embodiments are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein provide an electronic device that includes a display and multiple devices that each use or share at least a portion of the display area. By way of example only, the multiple devices can include a touch sensing device and a force sensing device. The touch and force sensing devices can each use at least a portion of the top surface of the display screen as an input surface.

A controller can be operatively connected to the display, the touch sensing device, and the force sensing device. The controller can output a force sync signal to the force sensing device that indicates one or more first time periods in which a force sensing operation can be performed in the force sensing device. Similarly, the controller can output a touch sync signal to the touch sensing device that indicates one or more second time periods in which a touch sensing operation can be performed in the force sensing device.

In one embodiment, one or more force sensing operations can be performed during a pixel refresh time period of the display. The force measurements occur at a time when the noise produced by the display is minimized, reduced, or settled. In this way, the force measurements are substantially synchronized to the display noise waveform. One or more touch sensing operations can be performed during the pixel refresh time period of the display, or outside of the pixel refresh time period. When the one or more touch sensing operations occur during the pixel refresh time period, the first and second time periods can be distinct non-overlapping time periods. Additionally or alternatively, the touch measurements can occur at a time when the noise produced by the display is minimized, reduced, or settled and the touch measurements can be substantially synchronized to the display noise waveform.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting.

Figure 1:
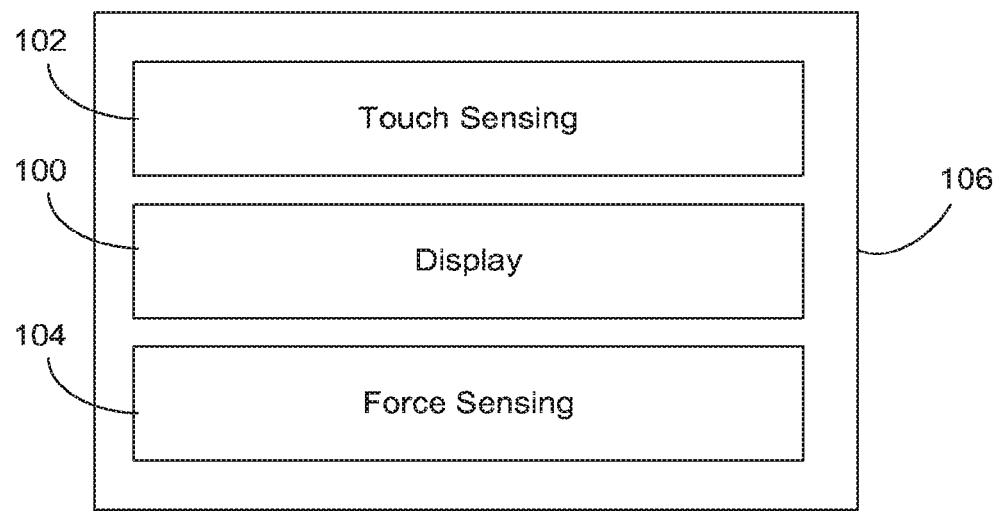
FIG. 1 is a conceptual cross-sectional view of a display screen that can be used to perform multiple functions.

Referring now to FIG. 1 there is shown a conceptual cross-sectional view of a display that can be used to perform multiple functions. The functions can include a display function 100, a touch sensing function 102, and a force sensing function 104. These functions can be performed in conjunction with the display 106. In other words, a user can interact with an image displayed on the display 106 with one or more touches, an applied force, or both touch and force. For example, a game that is displayed on the display 106 can receive touch inputs from a user. As another example, an application displayed on the display 106 can perform one function at one rate of speed when a user applies a small amount of force to the display and perform the function at a faster rate of speed when the user applies a greater amount of force to the display 106.

The touch sensing and force sensing functions can each use or share some or all of the display area. For example, in one embodiment, a user can interact with a displayed image by touching and/or by applying a force at an appropriate position on the display, with the appropriate position located anywhere on the display. In another embodiment, the display function 100 and the touch sensing function 102 can use the entire display 106 while the force sensing function 104 involves a portion of the display 106. Thus, each function can use some or all of the display 106 when in operation. The arrangement of the functions in FIG. 1 is for illustrative purposes only, and does not correspond to any layers or devices in the display or in electronic device. Additionally, the arrangement of the functions does not correspond to the amount of area on the display used by each function.

Figure 2:
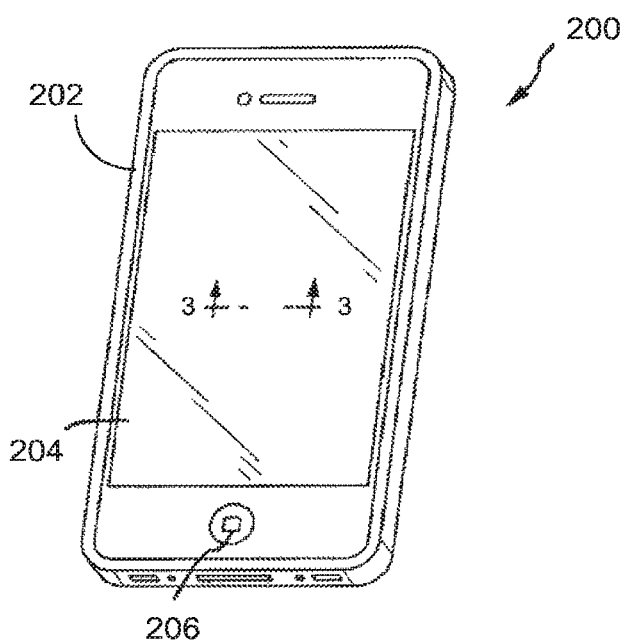
FIG. 2 is a perspective view of one example of an electronic device that can multiplex signals for multiple functions.

FIG. 2 depicts one example of an electronic device that can be configured to perform multiple functions with respect to a display. In the illustrated embodiment, the electronic device 200 is implemented as a smart telephone. Other embodiments can implement the electronic device differently, such as, for example, as a laptop computer, a tablet computing device, a wearable computing device or display, a digital music player, a display input device, a kiosk, a remote control device, television, and other types of electronic devices that include a display.

The electronic device 200 includes an enclosure 202 surrounding a display 204 and one or more buttons 206 or input devices. The enclosure 202 can form an outer surface or partial outer surface and protective case for the internal components of the electronic device 200, and may at least partially surround the display 204. The enclosure 202 can be formed of one or more components operably connected together, such as a front piece and a back piece. Alternatively, the enclosure 202 can be formed of a single piece operably connected to the display 204.

The display 204 can be implemented with any suitable display, including, but not limited to, a multi-touch sensing touchscreen device that uses liquid crystal display (LCD) technology, light emitting diode (LED) technology, organic light-emitting display (OLED) technology, or organic electro luminescence (OEL) technology. The button 206 can take the form of a home button, which may be a mechanical button, a soft button (e.g., a button that does not physically move but still accepts inputs), an icon or image on a display, and so on. Further, in some embodiments, the button 206 can be integrated as part of a cover glass of the electronic device.

It should be noted that FIG. 2 is illustrative only. In other examples, an electronic device may include fewer or more components than those shown in FIG. 2.

Figure 3:
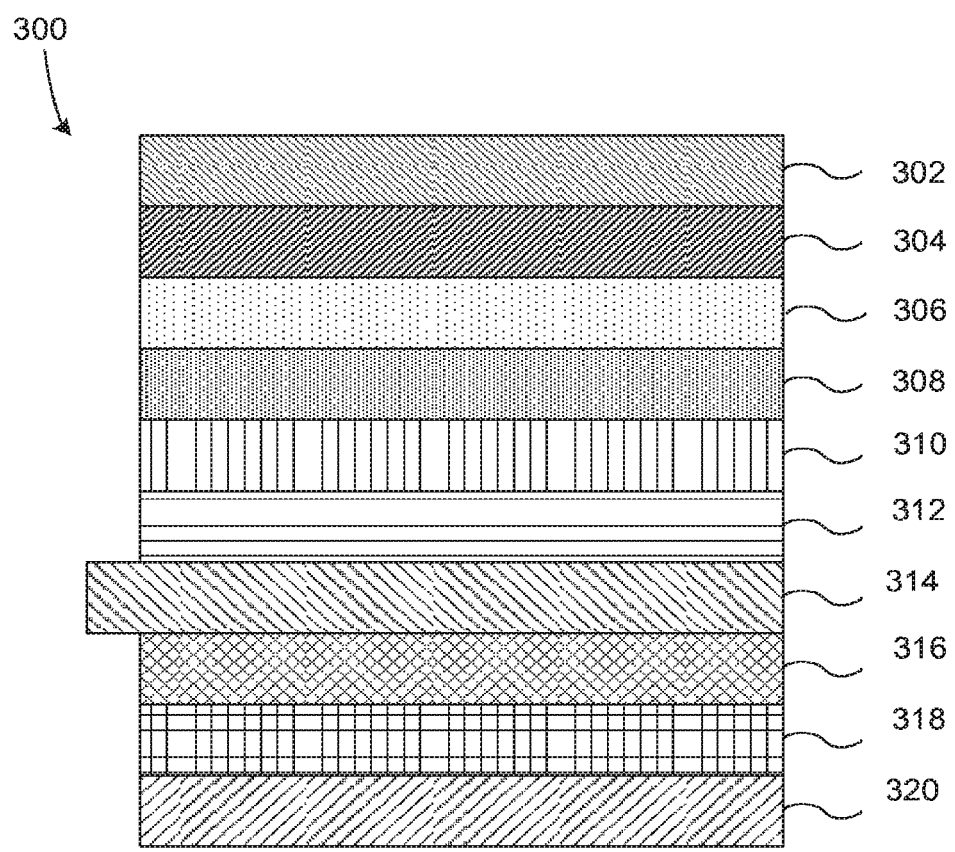
FIG. 3 is a simplified schematic cross-section view of the display 204 taken along line 3-3 in FIG. 1.

FIG. 3 illustrates a cross-section view of the display taken along line 3-3 in FIG. 2. The layers of the display stack 300 illustrate the layers that constitute the display 204. Other embodiments can omit one or more layers and/or add one or more layers to a display stack 300. The layer or layers in the display stack may be determined by the type of display technology included in the display.

A top layer in the display stack 300 can be a cover glass 302 that is disposed over one or more intermediate layers 304. The cover glass 302 can be a flexible touchable surface that is made of any suitable transparent material, such as, for example, a glass, a plastic, or sapphire. The cover glass 302 receives touch and force inputs from a user and acts as an input surface for a touch sensing device and a force sensing device. The user can touch the cover glass 302 with one or more fingers or with another element such as a stylus.

The one or more intermediate layers 304 can be implemented with ally suitable layer. Examples of an intermediate layer include an ink layer and an optically clear adhesive.

A touch sensing layer 306 can be positioned below the one or more intermediate layers 304. The touch sensing layer 306 senses a touch event on the cover glass. The touch sensing layer 306 can be implemented with any suitable touch sensing technology. For example, capacitive, optical, ultrasonic, and resistive touch sensing technologies can be included in the touch sensing layer 306.

A front polarizer 308 can be positioned below the touch sensing layer 306, and a front transparent conductive layer 310 can be positioned below the front polarizer 308. The front transparent conductive layer 310 can be made of any suitable material, such as an ITO. The front transparent conductive layer 310 may, for example, provide electrostatic protection to prevent electrical discharge into a display.

A color filter layer 312 can be positioned below the front transparent conductive layer 310. The color filter layer 312 can provide the colors for a color display. The color filter layer 312 can be implemented in any suitable form and can include a color filter layer that is known and used in the art. By way of example only, a RGB color display can include a color filter having filter elements that filter red, green, and blue light.

A display layer 314 can be positioned below the color filter layer 312. The display layer 314 may take a variety of forms, including a LCD, an LED display, and an OLED display. In some embodiments, the display layer 314 can be formed from glass or have a glass substrate. One example of a LCD display that can be included in the display layer 314 is described in more detail in conjunction with FIG. 6. In some embodiments, the touch sensing layer 306 can be combined with the display layer 314.

A back transparent conductive layer 316 can be positioned below the display layer 314. The back transparent conductive layer 316 may serve to prevent noise from entering the system through the display stack and thus may function as an isolation plane. In alternative embodiments, one or both of the conductive layers may have other functions and/or other layers, elements, and the like may be part of the display stack 300.

A back polarizer 318 can be positioned below the back transparent conductive layer 316. The front and back polarizers 308, 318 can be implemented in any suitable form and can include polarizers that are known and used in the art.

A force sensing layer 320 can be positioned below the back polarizer 318. The force sensing layer 320 is used to determine or estimate an amount of force applied to the cover glass 302. The force sensing layer 320 can be implemented with any suitable force sensing technology. For example, capacitive, ultrasonic, and piezoelectric force sensing technologies can be included in the force sensing layer 320.

In one embodiment, the touch and force sensing layers use capacitive sensing elements to detect touch and estimate applied force, respectively. Capacitive touch and force sensing devices detect touch and force by detecting capacitive changes in one or more capacitive sensing elements. In some embodiments, the capacitive sensing elements are implemented in the individual pixels of a display, thereby combining the display and capacitive sensing functions in each pixel. One example of force sensing through capacitance changes is disclosed in PCT Patent Application PCT/US2013/032712, which is incorporated herein by reference.

Figure 4A:
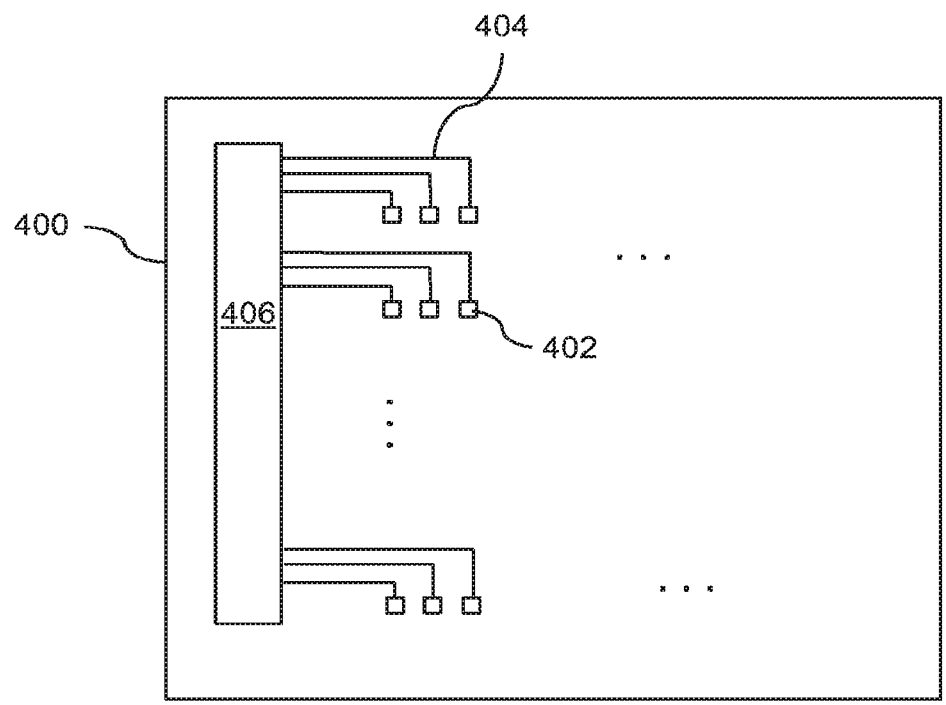
FIGS. 4A-4B depict conceptual drawings of an array of capacitive sensing elements that is suitable for use in a touch sensing layer and a force sensing layer.
Figure 4B:
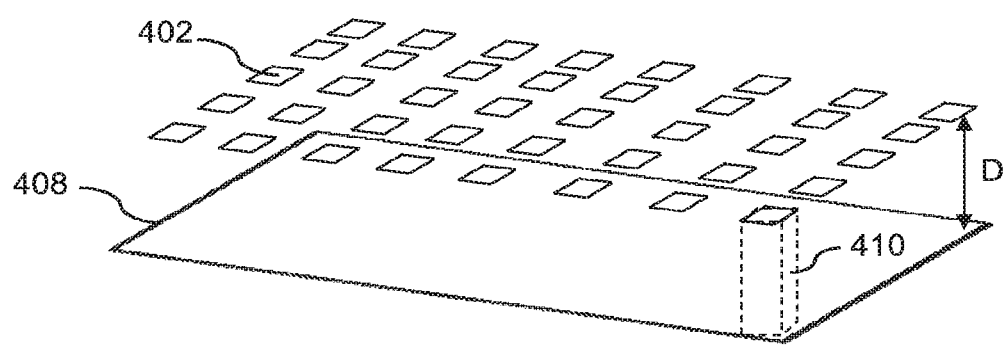

FIGS. 4A-4B depict conceptual drawings of an array of capacitive sensing elements at is suitable for use in a touch sensing layer and/or a force sensing layer. Each individual capacitive sensing element can be included in a pixel of a display. For simplicity, only the capacitive sensing function is described herein.

A conductive layer is patterned into a layer of discrete electrodes 402, with each electrode 402 included in a pixel and each electrode connected to a sense line 404. The sense lines 404 can be connected to sense circuits (not shown) through a sense interface 406. The discrete electrodes 402 are spaced apart from a common node layer 408 in the illustrated embodiment. A compressible gap having a distance D separates the layer of discrete electrodes 402 from the common node layer 408. The compressible gap can include an air gap, a compressible substance, or a compressible structure.

The combination of an individual electrode 402 and the common node 408 forms a capacitive sensing element 410. Typically, an insulating layer is disposed between the discrete electrodes 402 and the common node layer 408 to electrical isolate the common node layer from the discrete electrodes. In other embodiments, the layer of discrete electrodes 402 is positioned apart from another layer of discrete electrodes (not shown). The combination of a discrete electrode 402 in one layer and a corresponding spaced-apart discrete electrode in the other layer from a capacitive sensing element.

The common node 408 can be driven with an excitation signal when the capacitive sensors in the array of pixels operate in a mutual capacitance mode. The sense lines 404 are then scanned to measure the capacitance between each electrode 402 and the common node layer 408. Alternatively, when the capacitive sensing elements operate in a self-capacitance mode, the common node layer 408 is connected to a reference voltage, such as ground. In a self-capacitance system, the capacitance of a single electrode with respect to the common node layer (e.g., ground) is measured. A sense circuit (not shown) connected to a discrete electrode 402 through a sense line 404 senses or measures the capacitance between the electrode 402 and the common node layer 408.

Capacitive sensing elements can be constructed differently in other embodiments. For example, the capacitive sensing device can include a set of drive lines arranged in columns and a set of sense lines arranged in rows. In a mutual capacitance mode, the drive lines can be charged by drive signals output from one or more drive circuits (not shown) in or connected to the capacitive sensing device. Each drive line can be selected in turn and driven for a relatively short period of time, whereby each drive line is eventually selected in a round-robin fashion.

Similarly, sense lines can receive sense signals can be output by one or more sense interfaces in the capacitive sensing device and transmitted to one or more sense circuits (not shown). Like the drive circuits, the sense circuits can included a timed circuit that selects each sense line in turn and senses that row for a relatively short period of time, eventually selecting each sense line in a round-robin fashion.

Each intersection of a drive line and a sense line forms an individual capacitive sensing element. The individual capacitive sensing elements can be dispersed such that each capacitive sensing element represents a different position on the touch or force sensing device.

In other embodiments, a touch sensing device can be implemented as a multiple stimulus mutual capacitive sensing device. Multiple stimulus mutual capacitive touch sensing devices can be formed from a matrix of drive and sense lines, with sensors or pixels defined, in some embodiments, by where the drive and sense lines cross over or come close to each other while being separated by a dielectric material. Drive circuits can be coupled to the drive lines, and sense circuits can be coupled to the sense lines. During a scanning process, multiple drive lines are stimulated simultaneously to generate composite sense signals in the sense lines.

As described earlier, the capacitive sensing elements 410 can be used to detect touch and/or force. With touch, the capacitance of one or more capacitive sensing elements 410 changes when a finger or conductive stylus contacts, or hovers closely over the cover glass 302. A processing device (not shown) can determine the location of the touch based on the location(s) of the capacitive sensing elements that experience capacitive change(s).

With force, the distance D between a discrete electrode 402 and the common node layer 408 changes when a force is applied to the cover glass 302. The applied force causes the cover glass 302 to flex, which reduces the distance D in the illustrated embodiment. This distance change alters the capacitance of one or more capacitive sensing elements 410. The change in capacitance can be used to determine an amount of force applied to the cover glass 302, or to determine a change in an amount of applied force.

Like a touch sensing device, a force sensing device can operate in a self-capacitance mode or a mutual capacitance mode. In a mutual capacitance mode, as the display stack is pushed or otherwise moved downward, the capacitance of individual pixel capacitive sensing elements or row/column intersection may increase, since the layers are moved closer to one another. This increase in capacitance may be correlated to a decrease in distance between the layers, and thus, to an amount of force needed to move the layers a given distance.

Alternately, a force sensing device can operate in a self-capacitance mode. As the active layer moves toward the self-capacitive sense layer in response to an applied force on the cover glass 302, the capacitance measured at any individual pixel capacitive sensor or row/column intersection may change. Again, this change in capacitance may be correlated to a change in distance between the conductive layers and, thus, to an amount of force required to move the layers that distance.

In some embodiments, the touch sensing device s implemented as a separate distinct device from the force sensing device. Other embodiments can perform capacitive touch and force sensing functions with one capacitive sensing device.

For brevity, embodiments are described in conjunction with a capacitive force sensing device and a capacitive touch sensing device. However, as described earlier, embodiments are not limited to this type of touch and/or force sensing devices. Those skilled in the art will understand the signals used to control and/or perform touch and force sensing operations can be modified for the different types of touch and force sensing technologies.

Figure 5:
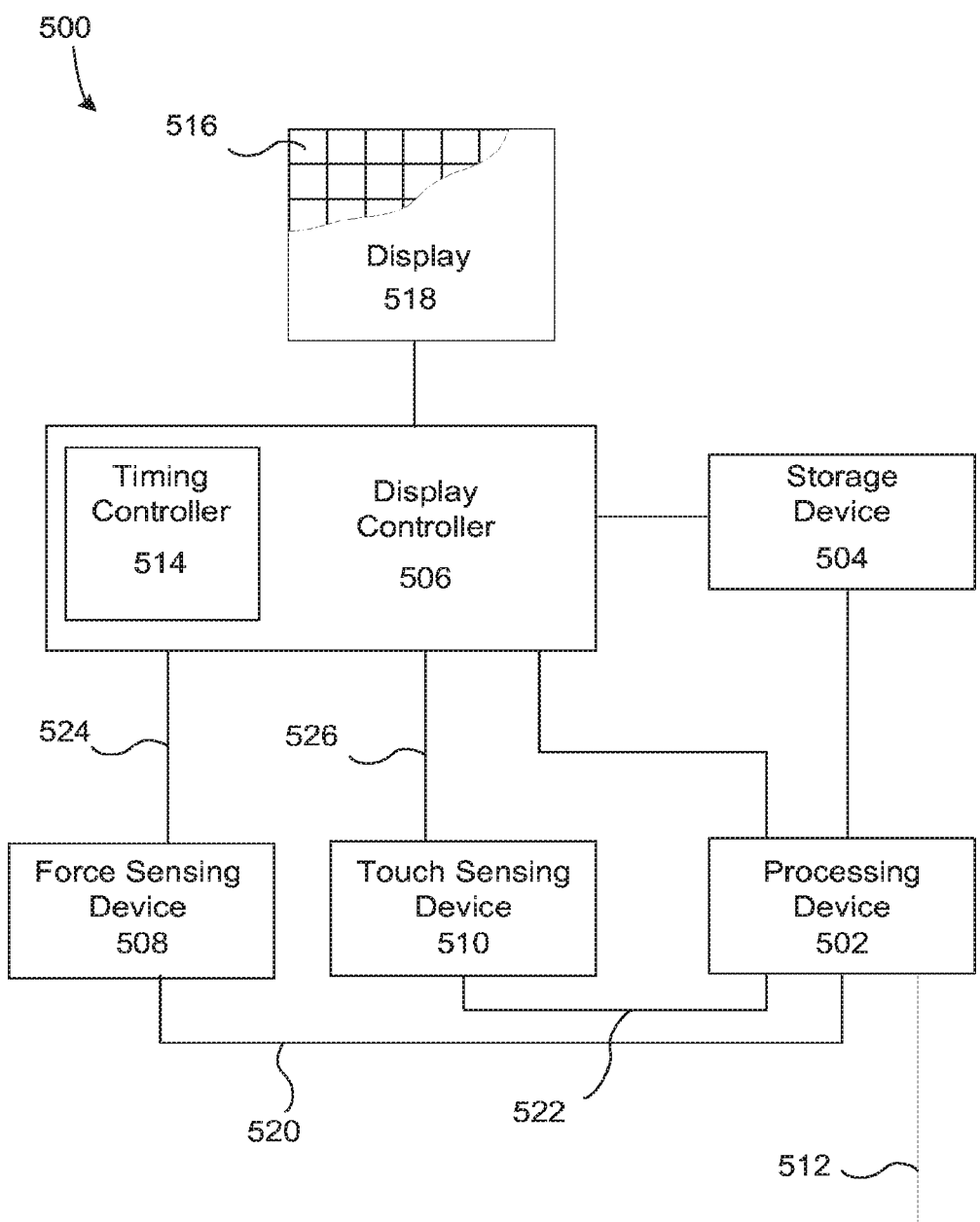
FIG. 5 is a block diagram of a system that includes a display, a force sensing device, and a touch sensing device.

FIG. 5 is a block diagram of a system that includes a display, a force sensing device, and a touch sensing device. A processing device 502 is operably connected to a storage device 504, a display controller 506, a force sensing device 508, and a touch sensing device 510. Image data is received by the processing device 502 on signal line 512 and stored in the storage device 504. The processing device 502 can be implemented with one or more suitable data processing devices, examples of which include a microprocessor, an application-specific integrated circuit (ASIC), and a central processing unit (CPU). The storage device 504 can be configured as one or more memories, including, but not limited to, RAM, ROM, flash memory, and removable memory, or combinations thereof.

The display controller 506 can include a timing controller 514 that generates timing and control signals for the display, the force sensing device, and the touch sensing device. The display controller 506 can be any suitable hardware, software, firmware, or combination thereof adapted to translate the image data into control signals for driving the pixels 516 of the display 518. The display controller can include other suitable components, such as a processing device and/or a storage device.

The processing device 502 receives the force sense signals from the force sensing device on signal line 520. The processing device 502 determines an amount of force, or a change in force, applied to an input surface (e.g., cover glass 302) based on at least one force sense signal. Additionally, the processing device 502 receives the touch sense signals from the touch sensing device on signal line 522. The processing device 502 determines one or more touch locations on the input surface based on at least one touch sense signal.

The display controller 506 transmits one or more force sync signals to the force sensing device on signal line 524. The display controller 506 also transmits one or more touch sync signals to the touch sensing device on signal line 526. Thus, in the illustrated embodiment, the display controller 506 functions as a master that transmits signals that indicate time periods when one or more touch sensing operations or one or more force sensing operations can be performed. The force and touch sync signals are described in more detail in conjunction with FIGS. 8 and 10.

Figure 6:
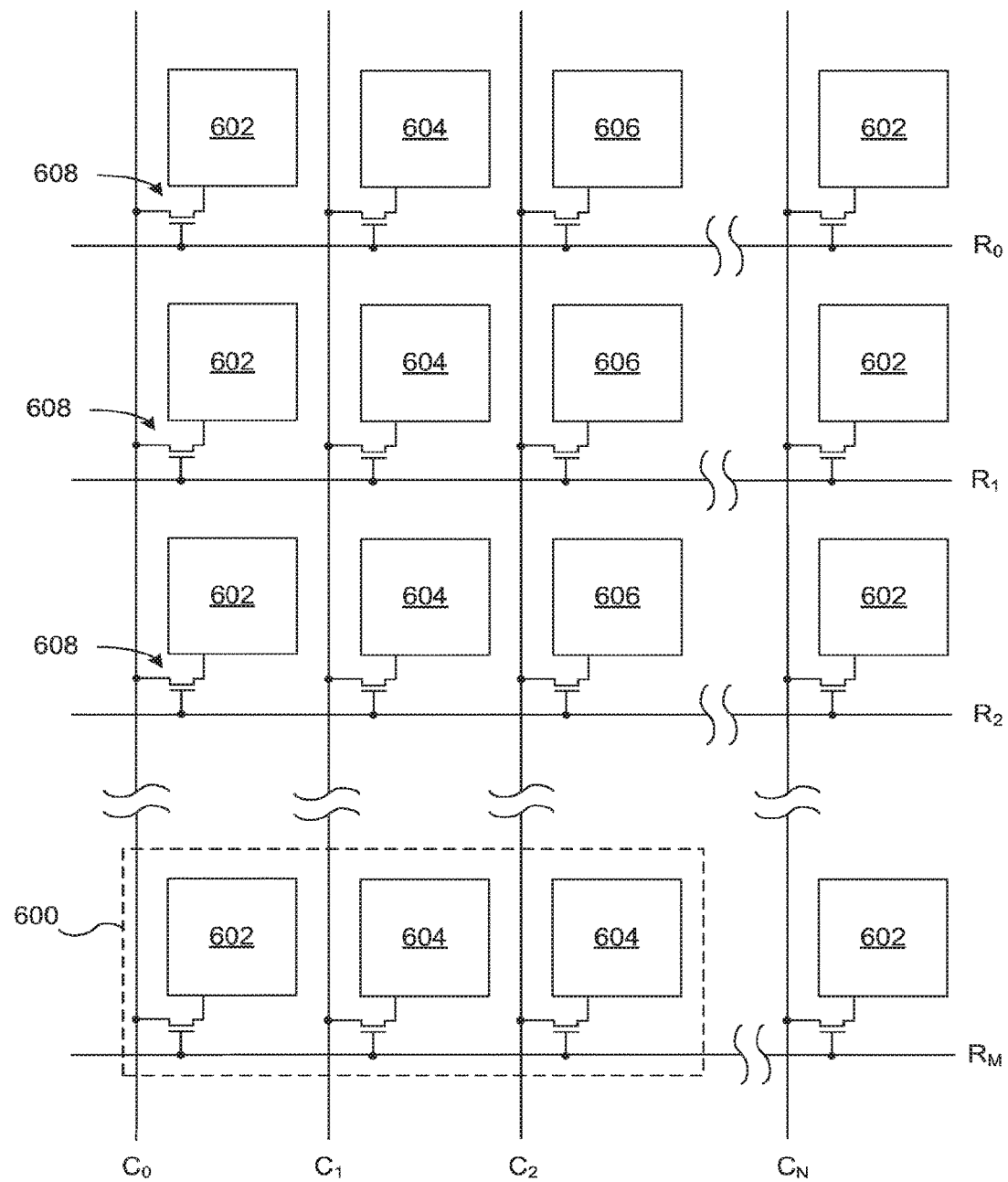
FIG. 6 is a simplified schematic of a TFT display suitable for use in the display 518 shown in FIG. 5.

In one embodiment, the display 518 is a multi-touch touchscreen thin-film-transistor liquid crystal display (TFT LCD). But as described previously, different types of displays can be used in other embodiments, such as, for example, LED and OLED. FIG. 6 depicts a simplified schematic of a TFT LCD display. The pixels 600 are arranged in rows and columns to form an array. When the display is a color display, each pixel 600 can include sub-pixels 602, 604, 606. The sub-pixels are associated with particular filter elements included in a color filter layer (e.g., 312 in FIG. 3). The filter elements produce a color image by passing light of certain wavelengths. For example, the filter elements can include a red filter, a blue filter, and a green filter, with a red filter overlying the sub-pixels 602, the green filter overlying the sub-pixels 604, and the blue filter overlying the sub-pixels 606. The red, green, and blue colors produced by the sub-pixels are combined to produce a color pixel 600.

Included in each sub-pixel is a transistor 608. Each transistor 608 connects to a respective column signal line $C_0$, $C_1$, $C_2$ ... $C_N$ and a respective row signal line $R_0$, $R_1$, $R_2$, ... $R_M$, where N and M are integer numbers. The sub-pixels are addressed in rows and columns, and each sub-pixel can be addressed individually. To address a particular sub-pixel, a row select signal is applied to a respective row signal line ($R_0$, $R_1$, ... $R_N$), which in turn activates all of the transistors 608 connected to that row signal line. A drive voltage transition is then applied to a respective column signal line. Since all of the other rows that intersect with the column signal line are turned off, only the transistor 608 at the designated sub-pixel receives the drive voltage transition. The picture information for an image can be received by the display through sub-pixel addressing. For example, the sub-pixels can be addressed by sequentially addressing one side of the matrix, for example by selecting the rows one-by-one and applying the pixel value on the other side at the columns row-by-row.

Many displays include a refresh rate where some or all of the pixels or sub-pixels in the display receive image data. A refresh rate typically refers to the number of times in a second that display circuitry refreshes data that is viewed on the display screen. The refresh rate is typically measured in frequency (Hz), which translates into the number of times per second a display can "redraw" or refresh the entire display screen. The higher the number for the refresh rate the faster the display screen is refreshed. For example, a refresh rate of 60 Hz means that a display can redraw the entire screen 60 consecutive times during a single second. Some displays have a fixed refresh rate that cannot be changed. Other displays can have a variable refresh rate where a display can operate at more than one refresh rate.

The drive voltage transitions on the column lines produce noise spikes that can adversely affect the force sensing device by overwhelming the force sense signals. The magnitude of the noise spikes can be much greater than the magnitude of the force sense signals. Embodiments described herein determine time periods that can improve force sensing operations and touch sensing operations when force sensing and touch sensing devices each use or share at least a portion of the display area. In one embodiment, one or more force sensing operations are performed during a pixel refresh time period, and one or more touch sensing operations can be performed during the pixel refresh time period or outside of the pixel refresh time period. A system can determine when the noise spikes are expected to occur and perform force and/or touch sensing operations at times when the noise is minimized, reduced, or settled.

Figure 7:
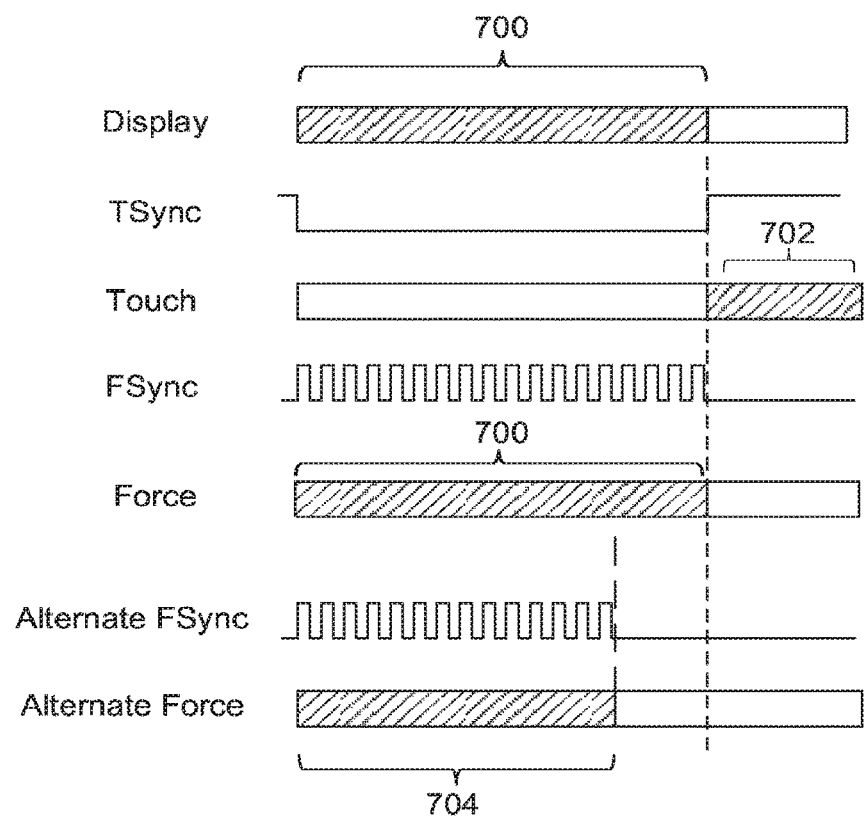
FIG. 7 illustrates an example device operations diagram suitable for use in the system 500 shown in FIG. 5.

FIG. 7 illustrates an example device operations diagram suitable for use in the system 500 shown in FIG. 5. The hatched areas in the display, touch sensing, and force sensing plots represent times when each function is operating and the clear areas when the function is not operating. In the illustrated embodiment, the display function operates during a first time period 700 and the touch sensing operation during a separate non-overlapping second time period 702. Thus, the touch sensing device scans the touch sensing elements when the display is not active.

In one embodiment, the force sensing device is operable during the entire first time period 700 when the display is operating. The force sensing device scans the force sensing elements when the display is active. In another embodiment, the force sensing device is operating only during a portion of the first time period when the display is active. In other words, the force sensing device operates during a third time period 704 which is a subset of the first time period 700.

Different signals can be used to activate or instruct the force and touch sensing devices of time periods that are optimal or suitable to perform a force or touch sensing operation. A force and/or touch sensing operation can include one or more steps. For example, when a force sensing device is a capacitive force sensing device operating in a mutual capacitance mode, the common node or one set of electrodes are driven with an excitation signal and then the sense lines are scanned to determine the capacitances of the capacitive sensing elements. As another example, when a touch sensing device operates in a self-capacitance mode, the sense lines are scanned to determine the capacitances of the capacitive sensing elements.

In one embodiment, a force sync signal (FSync) is transmitted by the display controller to the force sensing device to indicate when each refresh operation is occurring in the display. The FSync signal can be used to indicate a low-noise period that can be used to perform a force sensing operation. As described earlier, a refresh operation can be performed on a portion of the pixels during one pixel refresh period or on all of the pixels in the display. By way of example only, during each refresh operation the pixels associated with one color within a row are refreshed at a time. So in a display that includes red, green, and blue colors the pixels associated with the color red in one row can be refreshed in one refresh operation, the pixels associated with the color green in the row can be refreshed in another refresh operation, and the pixels associated with the color blue in the row can be refreshed in yet another refresh operation. In another embodiment, the pixels associated with one color can be refreshed at one time. In one embodiment, the timing of the R,G,B refresh operations can be altered to change the order of the refresh operations.

In one embodiment, a different signal, a touch sync signal (TSync) is transmitted by the display controller to the touch sensing device to indicate time periods that are optimal or suitable to perform a touch sensing operation. The TSync signal can indicate the edges of a pixel refresh time period. In one embodiment, touch sensing operations are performed by the touch sensing device when the display is not active (outside of a pixel refresh time period). In another embodiment, touch sensing operations are performed by the touch sensing device during a portion of the time period in which the display is active (during a pixel refresh time period). In other embodiments, the FSync and TSync signals can be the same signal.

In the embodiment shown in FIG. 7, the force sync signal FSync includes a series of pulses with each pulse indicating when a row of pixels is being refreshed. Each individual pulse indicates a low-noise period in the display that can be optimal or suitable for performing force sensing operations. The series of pulses are transmitted during the time period 700. The touch sync signal TSync includes a rising edge and a falling edge that indicate the start and ending times of an optimal or suitable time period for performing one or more touch sensing operations. TSync is transmitted during the time period 702.

In the alternate embodiment shown in FIG. 7, the series of pulses are transmitted during the third time period 704. As described earlier, the third time period 704 occurs during a portion of the first time period 700. The Fsync pulses are transmitted during the time period 704, with each pulse indicating when a row of pixels in the display is being refreshed.

Figure 8:
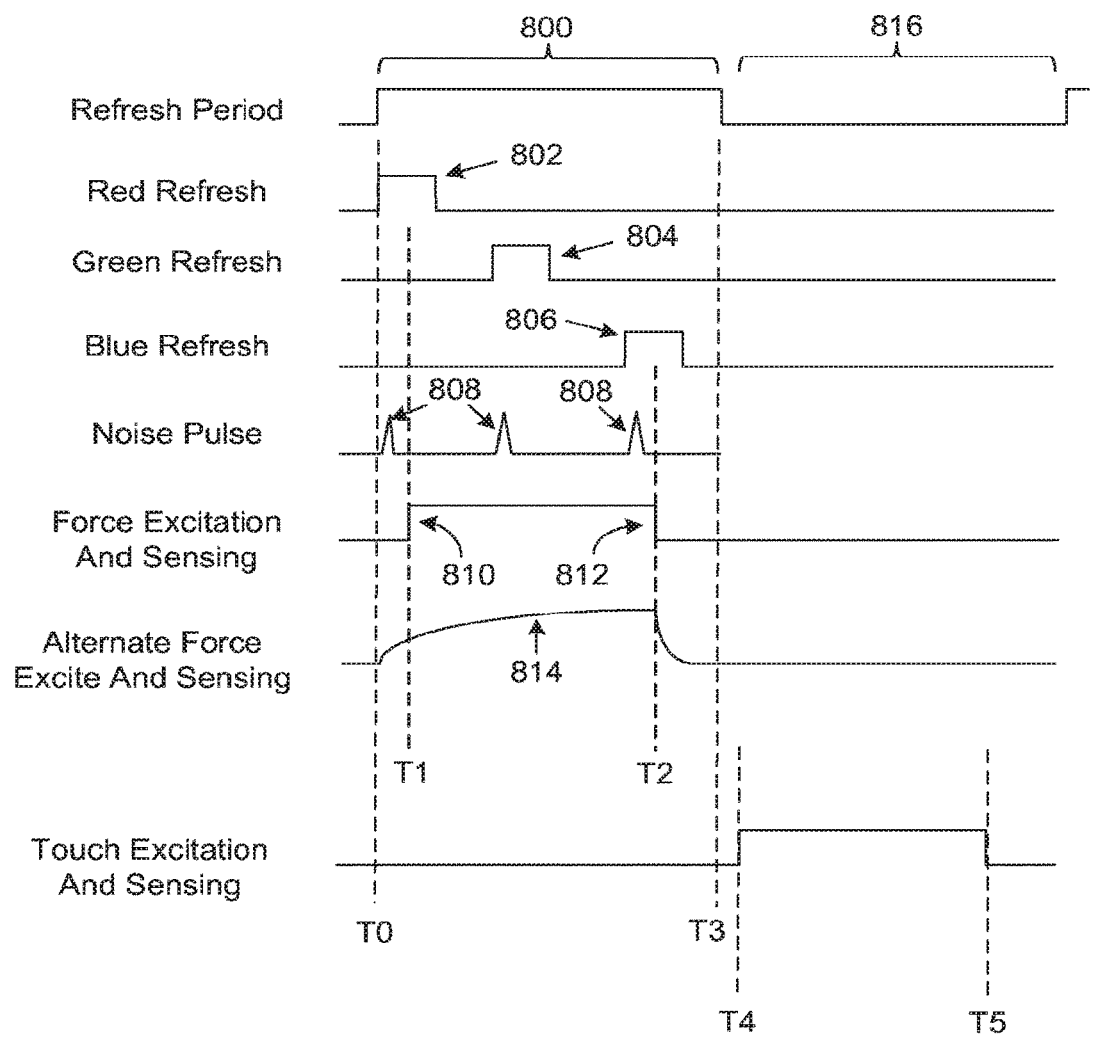
FIG. 8 depicts an example timing diagram suitable for use in the system 500 shown in FIG. 5.

Referring now to FIG. 8, there is shown an example timing diagram suitable for use in the system 500 shown in FIG. 5. A pixel refresh time period 800 includes one or more refresh operations that refresh some or all of the pixels in the display. As described previously, a single refresh operation can refresh only a portion of the pixels in the display, such as a row of pixels, or a single refresh operation can refresh all of the pixels in the display at one time.

In the illustrated embodiment, the timing diagram is for a color TFT LCD display and each line of pixels (e.g., row) is refreshed in a single pixel refresh time period 800. Within each refresh time period 800, all of the sub-pixels in the row that are associated with only one color are refreshed sequentially. Thus, the pixel refresh time period 800 includes three refresh operations. By way of example only, the sub-pixels associated with the color red are refreshed during a first refresh operation 802 that begins at time T0. The sub-pixels associated with the color green are refreshed during a second refresh operation 804. And the sub-pixels associated with the color blue are refreshed during a third refresh operation 806.

With a TFT LCD display, a refresh operation is performed by first applying a select signal to the particular row signal line for the pixels to be refreshed. A drive voltage transition is then applied to the column signal lines connected to the sub-pixels to be refreshed. However, a noise pulse 808 can be produced when the drive voltage is applied to the respective column signal lines. Therefore, during a single pixel refresh period 800, the force sensing device can experience three noise pulses 808. But because the column signal lines are enabled, the noise that impacts the force sensing device diminishes over time. Therefore, in one embodiment, the force sensing device receives one or more force excitation signals at a time in pixel refresh time period 800 that allows the effect of the one or more force excitation signals to be reduced or eliminated. The force sensing device outputs one or more force sense signals later in the pixel refresh time period 800 when the noise is minimized, reduced, or settled. This allows the force sensing device to more accurately measure the capacitances on the capacitive sensing elements.

In the illustrated embodiment, a force sensing device receives a force excitation signal at time T1 and produces a force sense signal at time T2. The force excitation signal is received on the rising edge 810 after the first noise pulse 808 in the pixel refresh period 800. The first noise pulse is the noise pulse that occurs during or after the first refresh operation 802. The force excitation signal occurs at a time in the pixel refresh time period where the data for some pixels or sub-pixels, such as a majority of the pixels or sub-pixels, still needs to be refreshed. The display is over-writing (e.g., refreshing) any effects of the force excitation signal.

The force sense signal is received on the falling edge 812 after the last noise pulse 808 that occurs during the pixel refresh period 800. The last noise pulse is the noise pulse 808 that occurs during or after the third refresh operation 806. The time period between times T1 and T2 allows any noise generated by the force excitation signal to be removed or reduced prior to sampling the capacitances on the capacitive sensing elements. This can increase or maximize the signal-to-noise ratio of the force sense signal, thereby improving the measurements of the capacitances of the capacitive sensing elements.

The rising and falling edges of the FSync signal can be used to control force sensing operations in the force sensing device. Similarly, the rising and falling edges of the TSync signal can be used to control touch sensing operations in the touch sensing device. Thus, embodiments time the rising and falling edges at times that are optimal or suitable for the performance of force and/or touch sensing operations. Changing the time of when a rising edge and/or a falling edge occurs controls the times when a force and/or a touch sensing operation occurs.

In another embodiment, the force excitation signal ramps up more slowly, as shown on curve 814. In the illustrated embodiment, the force excitation signal begins to increase at time T0 and continues to increase slowly until time T2. Other embodiments can begin to increase the force excitation signal at a different time, such as, for example, time T1. The amount of noise that may be produced by the force excitation signal can be eliminated or reduced in some embodiments when the force excitation signal is increased over time. The force sense signal can be output from the force sensing device at time T2.

One or more touch sensing operations are performed outside of the pixel refresh time period 800 in the illustrated embodiment. Thus, a touch excitation signal and a touch sense signal for each touch sensing operation can be received and produced by the touch sensing device during time period 816. In the illustrated embodiment, one or more touch sensing operations can occur during the time between time T4 and time T5. The time between time T4 and time T5 is outside of the pixel refresh time period 800.

Figure 9:
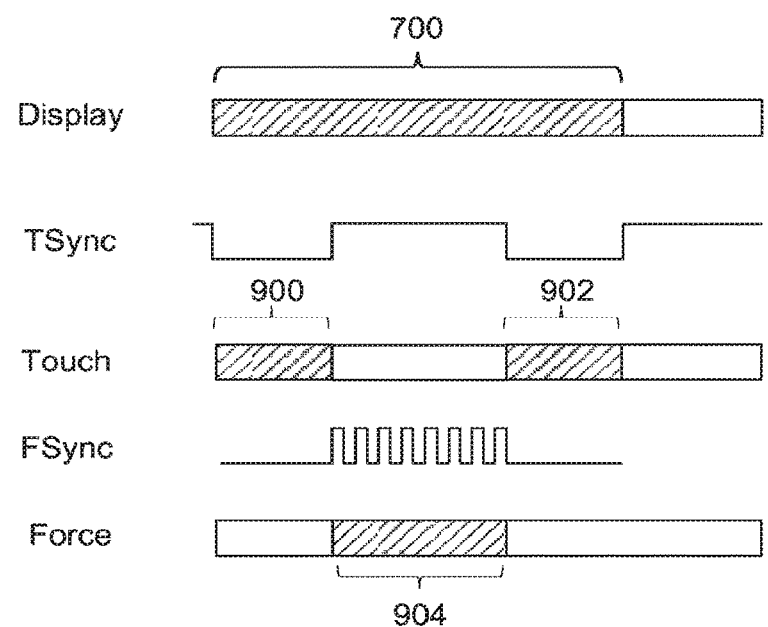
FIG. 9 illustrates another example device operations diagram suitable for use in the system 500 shown in FIG. 5.

FIG. 9 illustrates another example device operations diagram suitable for use in the system 500 shown in FIG. 5. The hatched areas in the display, touch sensing, and force sensing plots represent times when each function is operating and the clear areas when the function is not operating. In the illustrated embodiment, the display function operates during a first time period 700 and the touch sensing operation during time periods 900 and 902. The time periods 900 and 902 overlap with the first time period 700. Thus, the touch sensing device scans the touch sensing elements when the display is active.

In the illustrated embodiment, the force sensing device is operable during the time period 906, a time period that overlaps with only a portion of the first time period 700. Thus, the force sensing device also scans the force sensing elements when the display is active. Time period 904 does not overlap with time periods 900 and 902.

The TSync signal is transmitted by the display controller to the touch sensing device to indicate time periods that are optimal or suitable to perform a touch sensing operation. The FSync is transmitted by the display controller to the force sensing device to indicate time periods that are optimal or suitable to perform a touch sensing operation. In the embodiment shown in FIG. 9, the force sync signal FSync includes a series of pulses with each pulse indicating when a row of pixels is being refreshed. The series of pulses are transmitted only during a portion of the time period 700. The touch sync signal TSync includes a rising edge and a falling edge that indicate the start and ending times of an optimal or suitable time period for one or more touch sensing operations. TSync is transmitted during the time periods 900 and 902.

The touch sensing device in the FIG. 9 embodiment has a faster touch rate than in the embodiment of FIG. 7. Each pixel refresh time period 700 includes two time periods for the performance of one or more touch sensing operations. In the illustrated embodiment, the force sensing device follows the display in that there is only one time period 904 for performing force sensing operations in each pixel refresh time period 700. In other embodiments, the force sensing device can follow the touch sensing device where the force sensing device has a faster force rate (e.g., two time periods for performing one or more force sensing operations) than a single display frame. The timing of the FSync signal can be used to determine when the force sense signal or signals are received from the force sensing device.

Figure 10:
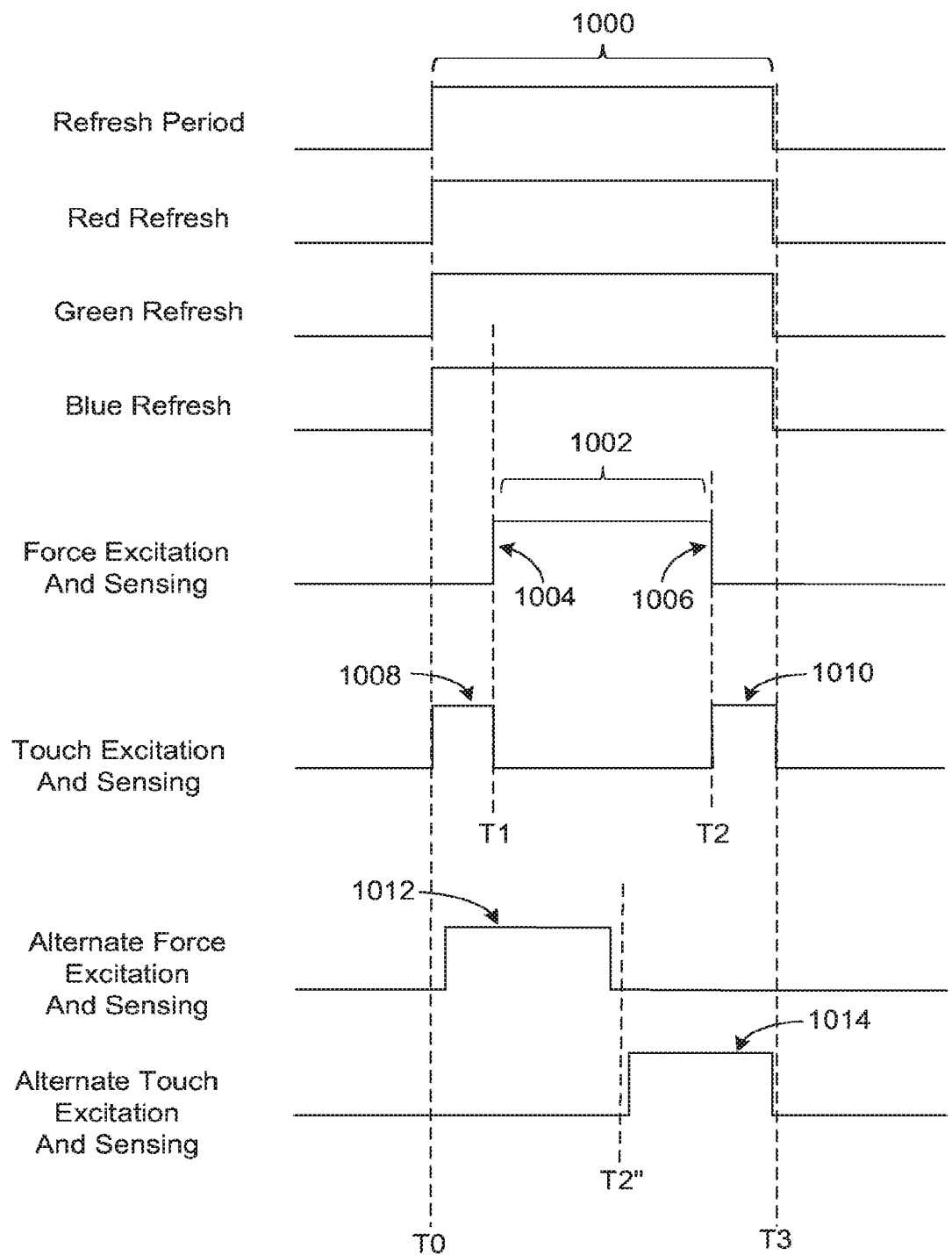
FIG. 10 depicts another example timing diagram suitable or use in the display system 500 shown in FIG. 5.

Referring now to FIG. 10, there is shown another example timing diagram suitable for use in the display system 500 shown in FIG. 5. A pixel refresh time period 1000 includes one or more refresh operations that refresh some or all of the pixels in the display. In the illustrated embodiment, the timing diagram is for a color display and all of the pixels are refreshed in a single pixel refresh time period 1000. The pixel refresh time period begins at time T0 and ends at time T3. Within each pixel refresh time period 1000, all of the sub-pixels or pixels are refreshed substantially simultaneously. Thus, the pixel refresh time period 1000 includes one refresh operation. For example, the sub-pixels or pixels associated with the colors red, green, and blue can be refreshed at the same time.

In the illustrated embodiment, the force sensing device receives a force excitation signal at time T1 and outputs a force sense signal at time T2. Thus, a force sensing operation is performed during the time period 1002, where the time period 1002 (time between times T1 and T2) occur within the pixel refresh time period 1000 (time between times T0 and T3). The force excitation signal is received after the refresh operation begins and the force sense signal received before the refresh operation has ended. In one embodiment, the force excitation signal is received at 1004 and the force sense signal at 1006.

One or more touch sensing operations can also be performed during the pixel refresh time period 1000. In the illustrated embodiment, one touch sensing operation occurs at 1008 and another at 1010. The first touch sensing operation is performed between time T0 and time T1, while the second touch sensing operation occurs between time T2 and time T3. A touch excitation signal and a touch sense signal can be received by the capacitive touch sensing device and produced by the touch sensing device for each touch sensing operation. Thus, one or more force sensing operations and one or more touch sensing operations can occur during a single refresh operation and pixel refresh time period 1000. A force sensing operation occurs during a first time period and a touch sensing operation during a second time period that does not overlap with the first time period.

In another embodiment, a force sensing operation can occur between time T0 and T2" during time period 1012 while a touch sensing operation occurs between time T2" and time T3 during time period 1014. Time period 1012 does not overlap with time period 1014, but both time periods 1012 and 1014 occur during time period 1000. As before, one or more force sensing operations and one or more touch sensing operations can occur during a single refresh operation and pixel refresh time period 1000. As described earlier, the timing of the FSync signal and the TSync signal (e.g., timing of rising and falling edges) can be used to control when a force sensing operation is performed and when a touch sensing operation is performed, respectively.

Figure 11:
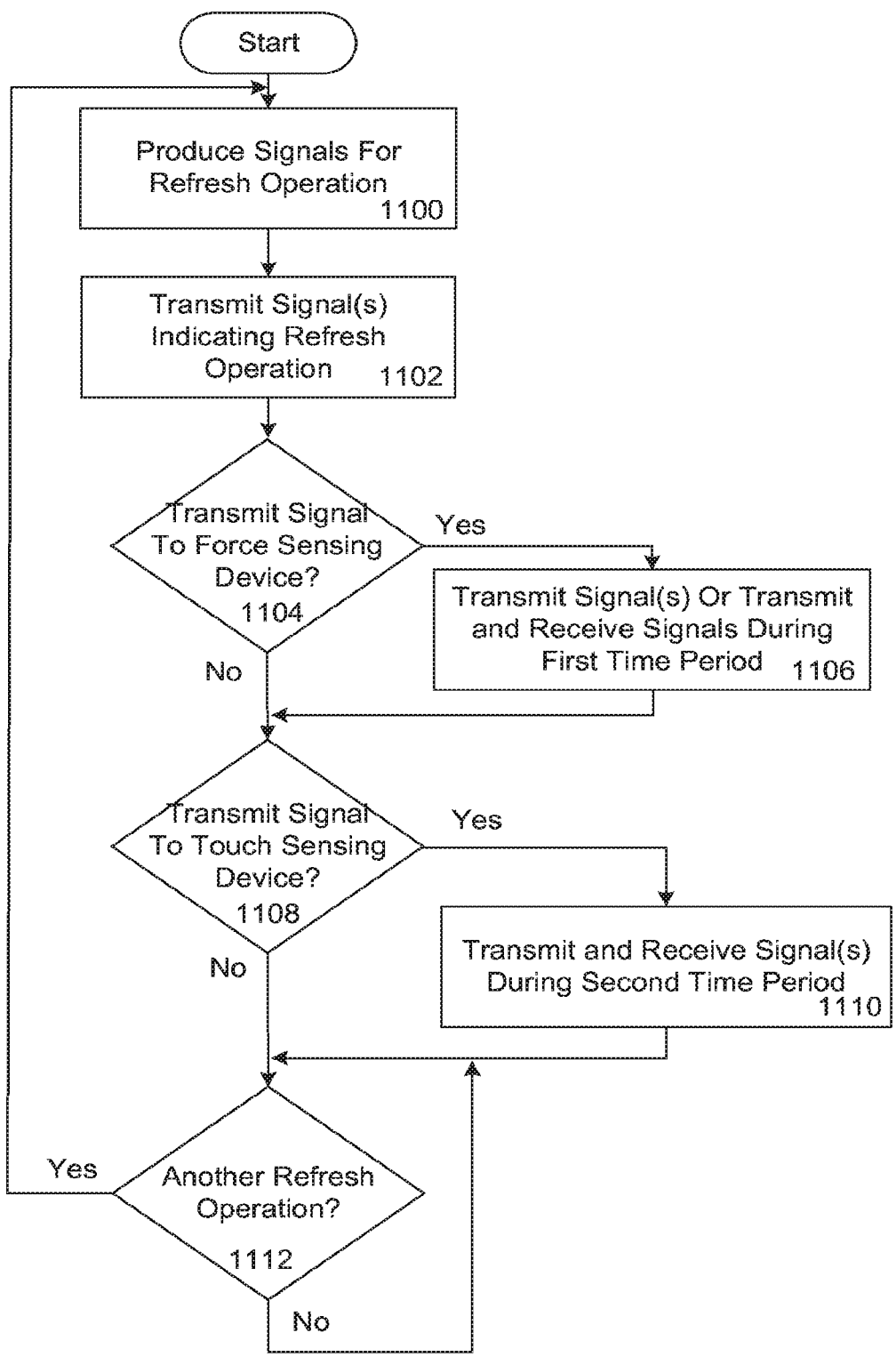
FIG. 11 is a flowchart of a method for performing multiple functions with a display in an electronic device.

FIG. 11 is a flowchart of a method for performing multiple functions with a display in an electronic device. Initially, the signals for a refresh operation are produced at block 1100. As previously described, one or more refresh operations can be performed during a pixel refresh time period. Next, as shown in block 1102, one or more signals can be transmitted to indicate a refresh operation is being performed. The one or more signals can be transmitted to a force sensing device and/or to a touch sensing device. In some embodiments, a touch sync (TSync) signal can be transmitted to the touch sensing device and a force sync (FSync) signal to the force sensing device.

A determination is then made at block 1104 as to whether one or more signals are to be transmitted to a force sensing device during the refresh operation. In some embodiments, a force excitation signal can be transmitted to the force sensing device during the refresh operation, but a force sense signal may not be received from the force sensing device. This can save power and maintain a consistent look on the display. For example, the force excitation signal may be transmitted to maintain a signal level and/or noise level on the display so that the look of the display is substantially consistent to a user.

If one or more signals are to be transmitted to a force sensing device, the process passes to block 1106 where one or more force excitation signals are received by the force sensing device. The one or more signals can be received during a first time period, which is the time period in which a force sensing operation can be performed. Additionally, one or more force sense signals can be received from the force sensing device during the first time period.

If one or more signals are not transmitted to a force sensing device, the method continues at block 1108 where a determination is made as to whether one or more signals are to be transmitted to a touch sensing device. In some embodiments, a touch excitation signal can be transmitted to the touch sensing device and a touch sense signal can be received from the touch sensing device when performing a touch sensing operation.

If one or more signals are to be transmitted to a touch sensing device, the process passes to block 1110 where one or more touch excitation signals are received by the touch sensing device and one or more touch sense signals are received from the touch sensing device. The one or more touch excitation signals and touch sense signals can be received during a second time period, which is the time period in which a touch sensing operation can be performed. The second time period does not overlap with the first time period of a force sensing operation in some embodiments.

If one or more signals are not transmitted to a touch sensing device, the method continues at block 1112 where a determination is made as to whether another refresh operation is to be performed. If so, the process returns to block 1100. If another refresh operation is not to occur, the method can wait until a refresh operation is to be performed.

Figure 12:
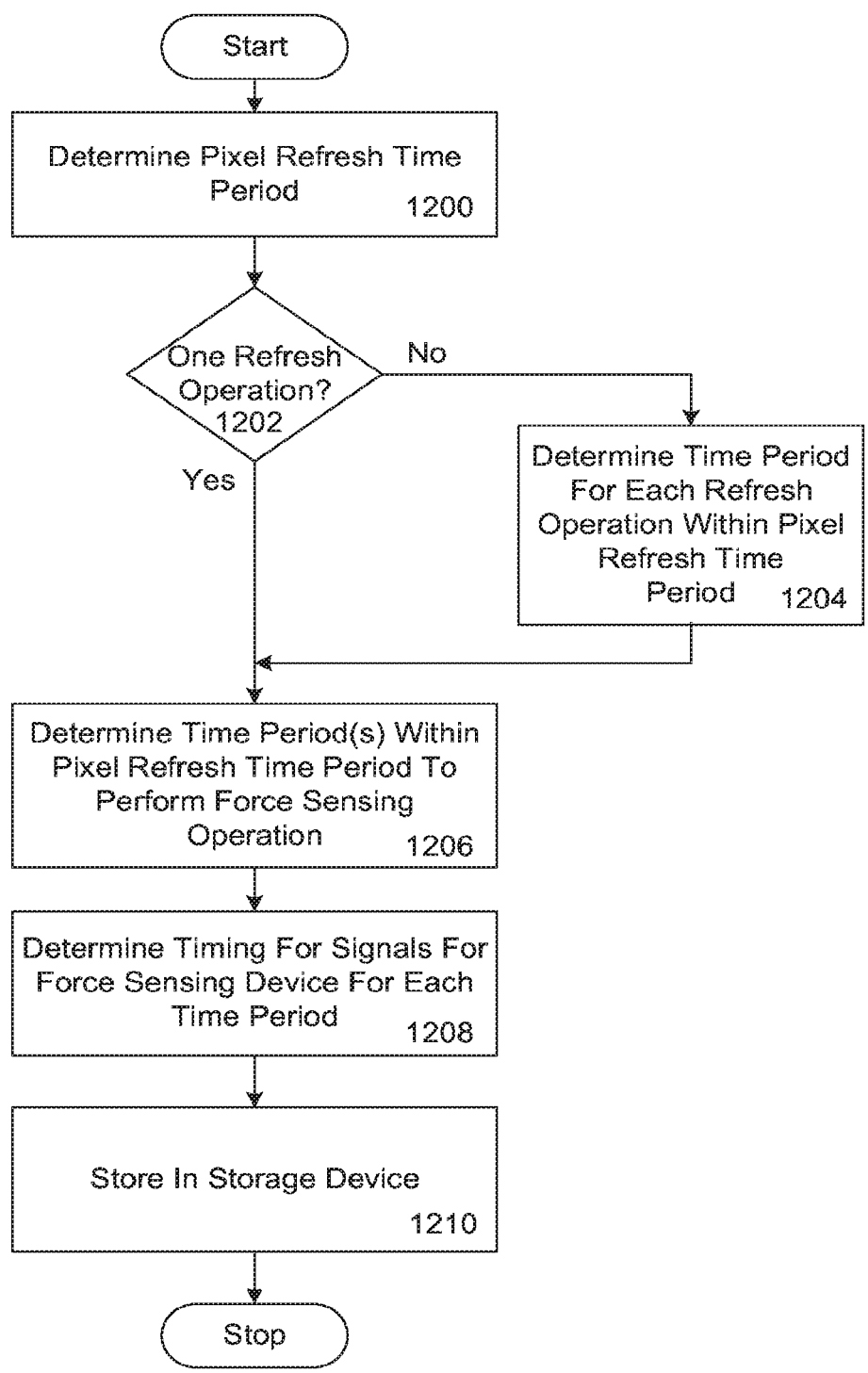
FIG. 12 is a flowchart of a method for determining the timing for a force sensing device.

Referring now to FIG. 12, there is a flowchart of a method for determining timing signals for a force sensing device. The embodiment of FIG. 12 can be performed when an electronic device is manufactured or at select times during use of the electronic device. In some embodiments, a display that has a variable refresh rate can perform the method when the refresh rate changes.

Initially, the pixel refresh time period is determined at block 1200. Some of the pixels in a display can be refreshed during the pixel refresh time period, or all of the pixels can be refreshed during the pixel refresh time period. A determination is then made at block 1202 as to whether or not a single refresh operation is to be performed during the pixel refresh time period. If more than one refresh operation is to be performed, the process passes to block 1204 where the time period for each refresh operation is determined. Thereafter, or if only one refresh operation is to be performed, the method continues at block 1206 where a time period for each force sensing operation is determined. The timing for the control and operational signals for each time period in block 1206 are then determined at block 1208. By way of example only, the timing for the FSync signal, a force excitation signal, and a force sense signal are determined in some embodiments. The timing and/or the signals can then be stored in a storage device, as shown in block 1210 (e.g., storage device 504 in FIG. 5).

Figure 13:
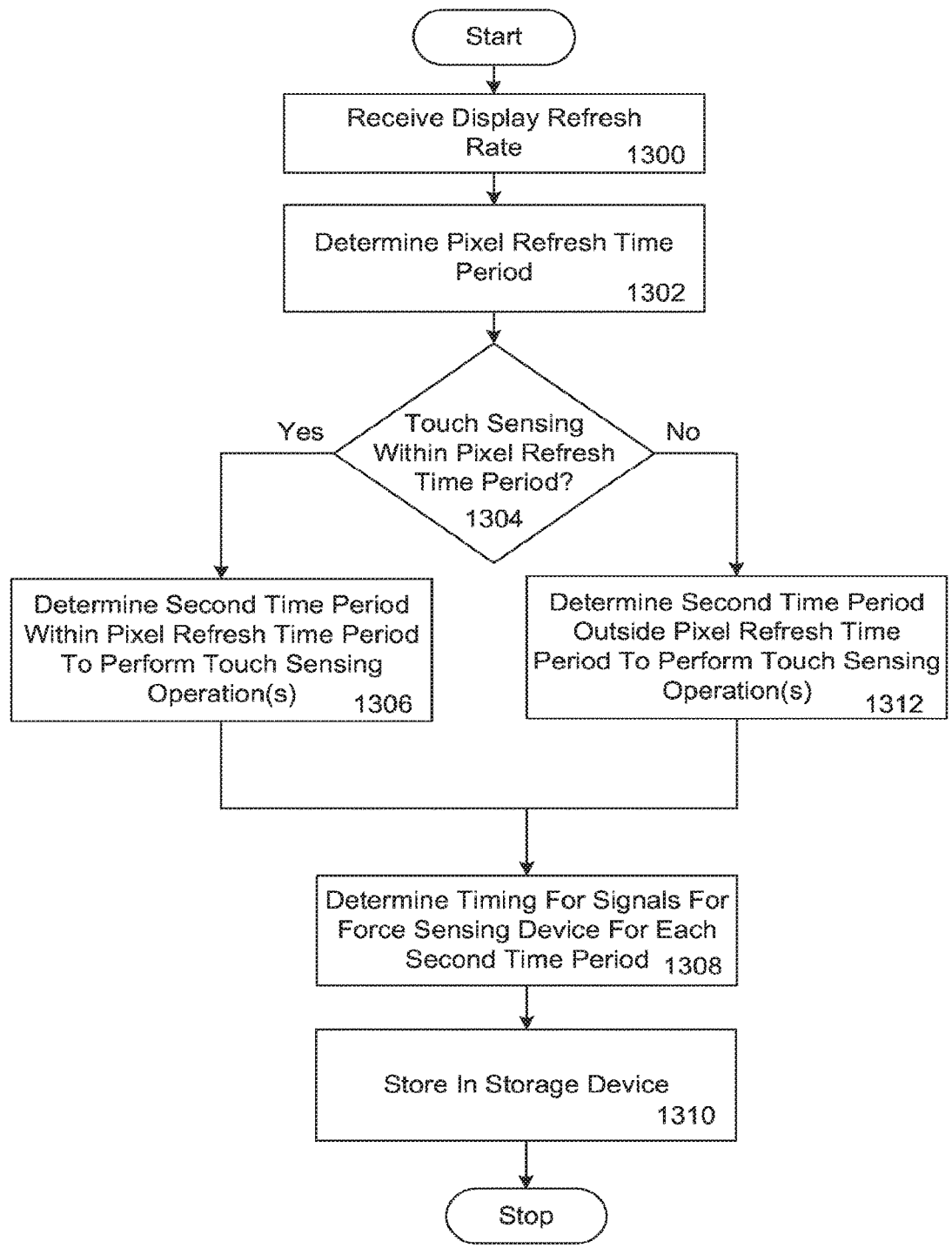
FIG. 13 is a flowchart of a method for determining timing signals for a touch sensing device.

FIG. 13 is a flowchart of a method for determining timing signals for a touch sensing device. As with the method shown in FIG. 12, the embodiment of FIG. 13 can be performed when an electronic device is manufactured or at select times during use of the electronic device. In some embodiments, a display that has a variable refresh rate can perform the method when the refresh rate changes.

Initially, the refresh rate of the display is received (block 1300) and the pixel refresh time period determined (block 1302). Some of the pixels in a display can be refreshed during the pixel refresh time period, or all of the pixels can be refreshed during the pixel refresh time period. A determination is then made at block 1304 as to whether or not one or more touch sensing operations are to be performed during the pixel refresh time period. If so, the process passes to block 1306 wherein a second time period within the pixel refresh time period is determined for the performance of each touch sensing operation. Thereafter, the timing for the signals (e.g., control and operational signals) for the touch sensing device for each second time period is determined at block 1308. By way of example only, the timing for the TSync signal, a touch excitation signal, and a touch sense signal are determined in some embodiments. The timing and/or the signals can then be stored in a storage device, as shown in block 1310 (e.g., storage device 504 in FIG. 5).

Returning to block 1304, if one or more touch sensing operations are to be performed outside of the pixel refresh time period, the method passes to block 1312 where a second time period outside of the pixel refresh time period is determined for each touch sensing operation. Thereafter, the timing for the signals (e.g., control and operational signals) for the touch sensing device for each second time period are determined (block 1308) and can be stored in a storage device (block 1310).

In some embodiments, a power saving mode can be included in an electronic device where the display, touch sensing device, and/or force sensing device operate at a reduced rate than the rate in the non-power saving mode (active mode). By way of example only, the touch sensing device can operate every two or three frames until the touch sensing device is awakened. The touch sensing device operates at a faster rate when active or awake. Similarly, the force sensing device operates at a reduced rate when in a power saving mode. As described earlier, a force excitation signal may be transmitted to the force sensing device to maintain a regular signal or noise level, which can maintain a consistent look to the display. When in a power saving mode, the touch sensing device and the force sensing device do not have to both be operating at the same rate. For example, the touch sensing device can run at a faster rate than the touch sensing device. As an example, the touch sensing device can run at 20 Hz while the force sensing device runs at 2 Hz.

In some embodiments, there are frames where the display is not active while the touch sensing device and the force sensing device is active. Alternatively, the display and the touch sensing device may be active while the force sensing device is not active. Similarly, the display and the force sensing device may be active while the touch sensing device is not active.

In some embodiments, the FSync signal can be transmitted independent of the display. The display can be turned off and an FSync signal can be received by the force sensing device to cause the force sensing device to operate while the display is off. The force sensing device can be used with the display off to calibrate the force sensing device. Additionally or alternatively, the force sensing device can be used to wake the display and/or the system. The same can be used for the touch sensing device, where a TSync signal can be received by the touch sensing device to cause the touch sensing device to operate while the display is off. The touch sensing device can be used with the display off to calibrate the touch sensing device. Additionally or alternatively, the touch sensing device can be used to wake the display and/or the system.

In some embodiments, the system can detect the noise pulses (e.g., 808 in FIG. 8) and the timing of the FSync and/or TSync signals timed to the detected noise pulses. For example, a force excitation signal can be transmitted 2 ms after a noise pulse is detected and a force sense signal received 5 ms after the noise pulse. Similarly, a touch excitation signal can be transmitted 3 ms after a noise pulse is detected and a touch sense signal received 6 ms after the noise pulse. Embodiments can select any given times for transmitting excitation signals and receiving sense signals.

Embodiments described herein use a form of time division multiplexing for performing touch and force sensing operations. Other embodiments can use a form of frequency division multiplexing to operate force and touch sensing devices.

Various embodiments have been described in detail with particular reference to certain features thereof, but it will be understood that variations and modifications can be effected within the spirit and scope of the disclosure. For example, a device other than a touch sensing device and/or a force sensing device can share at least a portion of the display area. By way of example only, a fingerprint sensor can use at least a portion of the top surface of the display as an input surface.

Even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. A method for operating a system that includes a display, a force sensing device, and a touch sensing device, the force sensing and touch sensing devices each sharing at least a portion of an area of the display, the method comprising:
    performing a refresh operation on at least a portion of pixels in the display during a pixel refresh time period;
    performing a force sensing operation in the force sensing device during a first time period that occurs during the pixel refresh time period; and
    performing a touch sensing operation in the touch sensing device during a second time period that occurs during the pixel refresh time period; wherein:
    the first time period and the second time period are non-overlapping time periods.

2. The method as in claim 1, wherein a combination of the first time period and the second time period substantially equals the pixel refresh time period.

3. A method for operating multiple functions in an area of a display, the method comprising:
    during a pixel refresh time period, performing a refresh operation on at least a portion of pixels in the display;
    during at least a portion of the pixel refresh time period, receiving a force sync signal to indicate a first time period in which a force sensing operation can be performed in a force sensing device; and during at least a portion of the pixel refresh time period,
receiving a touch sync signal to indicate a second time period in which a touch sensing operation can be performed in a touch sensing device during a second time period that occurs during the pixel refresh time period.

4. The method as in claim 3, wherein the force sync signal comprises at least one pulse, wherein each pulse occurs when at least a portion of the pixels in the display are refreshed.

5. The method as in claim 3, further comprising:
receiving one or more force excitation signals at the force sensing device during the first time period.

6. The method as in claim 5, further comprising:
receiving one or more force sense signals from the force sensing device during the first time period.

7. The method as in claim 3, further comprising:
during the second time period:
receiving at the touch sensing device one or more touch excitation signals; and
receiving from the touch sensing device one or more touch sense signals.

8. The method as in claim 3, wherein the first time period and the second time period are non-overlapping time periods.

9. A system, comprising:
a display comprising a plurality of pixels;
a force sensing device;
a touch sensing device, wherein the force sensing device and the touch sensing device each share at least a portion of an area of the display; and
a controller operatively connected to the display, to the force sensing device, and to the touch sensing device, wherein the controller is adapted to transmit, during a pixel refresh time period:
a first sync signal that is received by the force sensing device and indicates a first time period in which a first operation associated with the force sensing device can be performed; and
a second sync signal that is received by the touch sensing device and indicates a second time period in which a second operation associated with the touch sensing device can be performed.

10. The system as in claim 9, wherein:
the first operation comprises a force sensing operation; and
the second operation comprises a touch sensing operation.

11. The system as in claim 10, wherein the force sensing operation and the touch sensing operation occur at different time periods within the pixel refresh time period.

12. The system as in claim 9, wherein the controller comprises a display controller.

13. The system as in claim 9, further comprising a processing device that determines an amount of force applied to an input surface based on one or more force sense signals received from the force sensing device.

14. The system as in claim 9, wherein the processing device determines a location of at least one touch on an input surface based on one or more touch sensing signals received from the touch sensing device.

15. The method as in claim 1, wherein the second time period is less than the first time period.

16. The method as in claim 1, wherein a combination of the first time period and the second time period is less than the pixel refresh time period.

17. The method as in claim 1, further comprising:
performing the touch sensing operation in the touch sensing device during a third time period that occurs during the pixel refresh time period; wherein:
the second time period and the third time period are separated by the first time period.

18. The method as in claim 17, wherein a combination of the first time period, the second time period, and the third time period is less than the pixel refresh time period.

19. The method as in claim 1, wherein the at least portion of pixels in the display that are refreshed during the pixel refresh time period comprises red pixels, green pixels, and blue pixels.

20. The method as in claim 10, wherein the controller is adapted to transmit, during the pixel refresh time period:
a third sync signal that is received by the touch sensing device and indicates a third time period in which the touch sensing operation can be performed.

* * * * *